United States Patent
Tange et al.

(10) Patent No.: US 8,026,001 B2
(45) Date of Patent: Sep. 27, 2011

(54) ACTIVATION METHOD FOR LITHIUM HYDRIDE, AND HYDROGEN GENERATION METHOD

(75) Inventors: Kyoichi Tange, Susono (JP); Yoshitsugu Kojima, Higashihiroshima (JP); Takayuki Ichikawa, Higashihiroshima (JP); Chie Oomatsu, Higashihiroshima (JP); Satoshi Hino, Higashihiroshima (JP)

(73) Assignees: Toyota Jidosha Kabushiki Kaisha, Toyota-Shi (JP); Hiroshima University, Higashihiroshima-Shi (JP)

( * ) Notice: Subject to any disclaimer, the term of this patent is extended or adjusted under 35 U.S.C. 154(b) by 0 days.

(21) Appl. No.: 12/468,927

(22) Filed: May 20, 2009

(65) Prior Publication Data
US 2009/0291040 A1    Nov. 26, 2009

(30) Foreign Application Priority Data
May 22, 2008 (JP) ................................. 2008-133967

(51) Int. Cl.
- *C01B 3/02* (2006.01)
- *C01B 21/06* (2006.01)
- *C01B 21/092* (2006.01)
- *C01B 6/04* (2006.01)
- *C01C 1/00* (2006.01)
- *H01M 4/13* (2010.01)
- *H01M 4/58* (2010.01)
- *H01M 4/60* (2006.01)

(52) U.S. Cl. ............. 429/218.2; 429/209; 429/213; 429/218.1; 429/231.9; 429/231.95; 423/352; 423/364; 423/413; 423/645; 423/646; 423/648.1

(58) Field of Classification Search ............ 423/352, 423/364, 413, 645, 646, 648.1, 658.2
See application file for complete search history.

(56) References Cited

FOREIGN PATENT DOCUMENTS

| JP | 2005154232 | 6/2005 |
| JP | 2006205148 | 8/2006 |
| JP | 2006247512 | 9/2006 |
| JP | 2008-018420 | * 1/2008 |

OTHER PUBLICATIONS

Francis, "Lesson 10." Clackamas Community College (1999). Viewed Jun. 3, 2010 at http://dl.clackamas.edu/ch104-10/(6)ionic.htm.*

* cited by examiner

*Primary Examiner* — Stuart Hendrickson
*Assistant Examiner* — Daniel Berns
(74) *Attorney, Agent, or Firm* — Gifford, Krass, Sprinkle, Anderson & Citkowski, P.C.

(57) ABSTRACT

A lithium hydride activation method includes: a nitrification treatment process of reacting lithium hydride with a nitride and therefore forming a chemical compound layer stable to the nitride, on a surface of the lithium hydride; and a particle size reduction process of reducing a particle size of the lithium hydride provided with the chemical compound layer by a mechanical pulverization treatment after the nitrification treatment process is performed. A hydrogen generation method includes generating hydrogen by reacting ammonia with the lithium hydride activated by the activation method.

5 Claims, 1 Drawing Sheet

ACTIVATION METHOD FOR LITHIUM HYDRIDE, AND HYDROGEN GENERATION METHOD

INCORPORATION BY REFERENCE

The disclosure of Japanese Patent Application No. 2008-133967 filed on May 22, 2008 including the specification, drawings and abstract is incorporated herein by reference in its entirety.

BACKGROUND OF THE INVENTION

1. Field of the Invention

The invention relates to an activation method for lithium hydride, and to a hydrogen generation method that uses lithium hydride that has been activated by the activation method.

2. Description of the Related Art

Researches and studies on fuel cells, a promising technology as a global warming countermeasure, are being actively conducted in recent years. A fuel cell is a device which causes an electrochemical reaction in a structural body that includes an electrolyte layer and a pair of electrodes, and which extracts electric energy that is generated by this electrochemical reaction. Among the fuel cells, a solid polymer type fuel cell (hereinafter, sometimes referred to as "PEFC"), which is utilized in various fields, such as household cogeneration systems, motor vehicles, etc., employs a hydrogen-containing gas and an oxygen-containing gas. Therefore, in achieving a practical application of the PEFC, it is essential to establish a hydrogen production technology and a hydrogen storage technology.

As hydrogen storage technologies proposed until now, there are known a form in which a hydrogen gas is compressed and stored in a high-pressure hydrogen tank, a form in which liquid hydrogen is stored in a liquid hydrogen tank, and a form in which a hydrogen storage material that has stored hydrogen is stored in a tank. However, in the form that uses a high-pressure hydrogen tank, the volume of the tank is large therefore making the size reduction is difficult, and there also be other problems, including a problem of being liable to greatly consuming pressurization energy if the hydrogen pressure is raised. Besides, in the form that uses a liquid hydrogen tank, since it is necessary to continue cooling the hydrogen to a very low temperature (−253° C. or lower), it is likely to consume energy at the time of storage of hydrogen; besides, there are other problems, including a problem of it being difficult to avoid the "boil-off" in which liquid hydrogen evaporates by the heat that flows in from outside the tank. Therefore, the form that uses a hydrogen storage material is drawing attention since this form requires less energy for the storage, and is free from concerns of the boil-off, and the like.

As a technology related to a hydrogen storage material, Japanese Patent Application Publication No. 2005-154232 (JP-A-2005-154232), for example, discloses a hydrogen storage material that is constructed of a metal hydride and ammonia, and that generates hydrogen through a reaction between the metal hydride and ammonia. Furthermore, Japanese Patent Application Publication No. 2005-154232 (JP-A-2005-154232) discloses a technology that uses a metal hydride that has been made into fine particles by a predetermined mechanical pulverization treatment. Moreover, Japanese Patent Application Publication No. 2005-154232 (JP-A-2005-154232) also discloses a technology related to a hydrogen generation method in which a metal hydride and ammonia are enclosed in a reaction vessel, and reacting the metal hydride and ammonia to generate hydrogen by stirring or pulverizing the metal hydride within the reaction vessel. Besides, Japanese Patent Application Publication No. 2006-205148 (JP-A-2006-205148) discloses a production method for a hydrogen storage material which includes a mechanical pulverization treatment process of mechanically pulverizing a mixed material that contains lithium nitride and an aluminum-base composite hydride that contains an alkali metal. Besides, Japanese Patent Application Publication No. 2006-247512 (JP-A-2006-247512) discloses a hydrogen storage material characterized by being constructed of a mixture that contains a metal element-supplying particle, and a lithium imide particle and/or a lithium nitride particle, and characterized in that the metal element-supplying particle, and the lithium imide particle and/or the lithium nitride particle in the state of mixture have been given mechanical energy.

According to the foregoing technology disclosed in Japanese Patent Application Publication No. 2005-154232 (JP-A-2005-154232), Japanese Patent Application Publication No. 2006-205148 (JP-A-2006-205148), and Japanese Patent Application Publication No. 2006-247512 (JP-A-2006-247512), since the hydrogen storage material employed has been subjected to a mechanical pulverization treatment, it becomes possible to improve the utilization rate (rate of reaction) of the hydrogen storage materials used for the hydrogen generation reaction, in comparison with the case where the hydrogen storage material is not subjected to the mechanical pulverization treatment. Besides, according to the technology disclosed in Japanese Patent Application Publication No. 2005-154232 (JP-A-2005-154232) in which a metal hydride and ammonia reacted while the metal hydride is being pulverized, it becomes possible to increase the efficiency in the generation of hydrogen. However, if a vessel containing the metal hydride and ammonia is mounted in a fuel cell vehicle and the hydrogen generated while the metal hydride is being pulverized is supplied to the fuel cell, there arises a problem of it becoming difficult to prevent the pulverized metal hydride from flowing into the fuel cell over a long duration and therefore it being likely that a trouble, such as hydrogen leakage, malfunction, etc., will occur. Therefore, considering the application to fuel cell vehicles, it becomes necessary to increase the efficiency in the generation of hydrogen without performing a mechanical pulverization treatment during the hydrogen generation reaction. In order to accomplish this task, it is desirable to develop a technology that activates the hydrogen storage material into a form that is capable of increasing the utilization rate (reaction rate) of the hydrogen generation reaction. However, there is a problem of it being difficult to sufficiently activate the hydrogen storage material even by a combination of the technologies disclosed in Japanese Patent Application Publication No. 2005-154232 (JP-A-2005-154232), Japanese Patent Application Publication No. 2006-205148 (JP-A-2006-205148), and Japanese Patent Application Publication No. 2006-247512 (JP-A-2006-247512).

SUMMARY OF THE INVENTION

The invention provides a lithium hydride activation method that activates lithium hydride into a form capable of increasing the utilization rate, and a hydrogen generation method that uses the lithium hydride activated by the activation method.

A first aspect of the invention is a lithium hydride activation method that includes: a nitrification treatment process of reacting lithium hydride with a nitride and therefore forming a chemical compound layer stable to the nitride, on a surface of the lithium hydride; and a particle size reduction process of reducing a particle size of the lithium hydride provided with the chemical compound layer by a mechanical pulverization treatment after the nitrification treatment process is performed.

According to the lithium hydride activation method in accordance with the first aspect of the invention, since the particle size reduction process following the nitrification treatment process is provided, it becomes possible to activate lithium hydride into a form that improves the utilization rate of lithium hydride in the hydrogen generation reaction.

Besides, the nitride may include one or more species of nitrides selected from the group consisting of $NH_3$, $N_2H_2$, $C_4H_4N_2$, $C_4H_5N$, $C_3H_4N_2$, and $C_5H_5N$.

Therefore, it becomes possible to easily activate lithium hydride.

A second aspect of the invention is a hydrogen generation method that includes a process of generating hydrogen by reacting ammonia and the lithium hydride that has been activated by the lithium hydride activation method according to the first aspect of the invention.

According to the second aspect of the invention, since the lithium hydride activated by the first aspect of the invention is used, it is possible to provide a hydrogen generation method that is able to improve the efficiency in the generation of hydrogen.

A solid polymer type fuel cell in accordance with a third aspect of the invention includes a lithium hydride treated by using the lithium hydride activation method according to claim 1.

According to the solid polymer type fuel cell in accordance with the third aspect of the invention, since it becomes possible to activate lithium hydride into a form that improves the utilization rate of lithium hydride in the hydrogen generation reaction, the solid polymer type fuel cell can be reduced in size.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein.

DETAILED DESCRIPTION OF EMBODIMENTS

Figure 1:
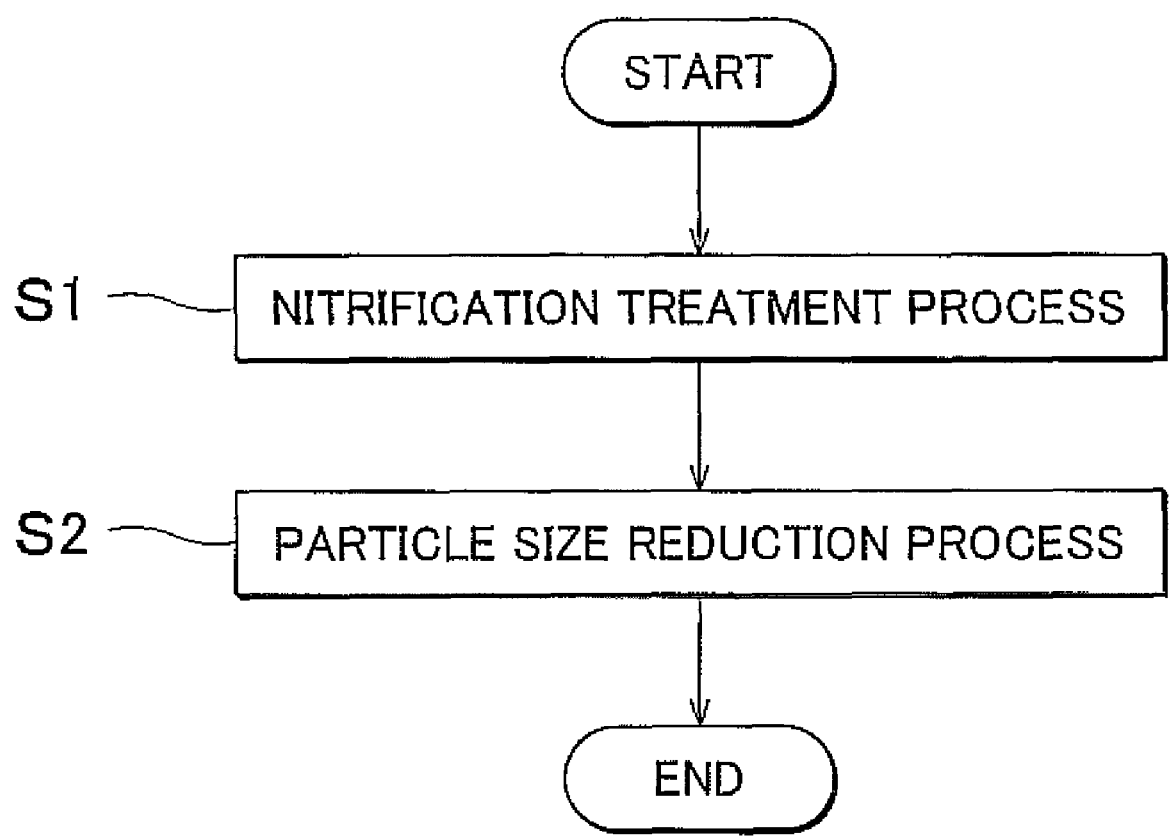
FIG. 1 is a flowchart showing an example form of an activation method for lithium hydride in accordance with the invention.

Hereinafter, the invention will be described with reference to the drawing. Incidentally, the embodiment and forms shown below are mere illustrations of the invention, and do not limit the invention.

FIG. 1 is a flowchart showing an activation method for lithium hydride in accordance with a first embodiment of the invention. As shown in FIG. 1, the lithium hydride activation method in accordance with the embodiment of the invention includes a nitrification treatment process (process S1), and a particle size reduction process (process S2). Through the process S1 and the process S2, lithium hydride is activated.

The process S1 is a process of forming on a surface of lithium hydride a chemical compound layer stable to a nitride that is to be reacted with lithium hydride in the process S1, by reacting lithium hydride and the nitride. For example, in the case where $C_5H_5N$ is used as the nitride, the reaction that occurs in the process S1 can be represented by the following formula 1:

$$LiH+C_5H_5N \rightarrow LiNC_5H_4+H_2 \qquad \text{(formula 1)}$$

That is, in the case where $C_5H_5N$ is used as the nitride, the process S1 is a process of forming a pyridine layer on a surface of lithium hydride.

On another hand, for example, in the case where $NH_3$ is used as the nitride, the reaction that occurs in the process S1 can be represented by the following formula 2:

$$LiH+NH_3 \rightarrow LiNH_2+H_2 \qquad \text{(formula 2)}$$

That is, in the case where $NH_3$ is used as the nitride, the process S1 is a process of forming a $LiNH_2$ layer on a surface of lithium hydride.

The process S2 is a process of reducing the particle size of the lithium hydride whose surface is provided with the chemical compound layer formed in the process S1 to a fine particle size, by a mechanical pulverization treatment in a hydrogen atmosphere. The particle size reduction is able to form new surfaces (new surfaces of lithium hydride) that are not provided with the chemical compound layer. Besides, by performing the process S2 in a hydrogen atmosphere, it becomes possible to restrain the formation of an oxide layer on the new surfaces. Thus, this embodiment fabricates a lithium hydride fine particle that has a surface that is not provided with a chemical compound layer. In the lithium hydride activation method of the invention, the method of the mechanical pulverization in the process S2 is not particularly limited. For example, lithium hydride can be reduced in particle size by using a planet ball mill, a vibratory ball mill, a jet mill, a hammer mill, etc.

Thus, the lithium hydride activation method in accordance with the first embodiment of the invention has the nitrification treatment process (process S1) that precedes the particle size reduction process (process S2). As also mentioned below in conjunction with examples of the invention, the utilization rate of lithium hydride can be greatly improved by performing the particle size reduction process after the nitrification treatment process. A reason for this is as follows. In comparison with the case where the nitrification treatment process is not performed, the nitrification treatment process performed prior to the particle size reduction process facilitates the particle size reduction of lithium hydride, so that it becomes possible to greatly improve the utilization rate of lithium hydride. Therefore, according to the first embodiment of the invention in which the process S1 and the process S2 are performed, it becomes possible to activate lithium hydride into a form that improves the utilization rate of lithium hydride in the hydrogen generation reaction.

Although the embodiment in which the particle size reduction process performed in a hydrogen atmosphere is provided is illustrated in the foregoing description regarding the lithium hydride activation method in accordance with the first embodiment of the invention, the invention is not limited to the foregoing form. It suffices that the particle size reduction process be performed in an atmosphere that is able to restrain the formation of an oxide layer on a lithium hydride surface, or the like. For example, it is also possible to perform the particle size reduction process in an inert atmosphere, such as a helium atmosphere, an argon atmosphere, etc.

Besides, in the foregoing description regarding the lithium hydride activation method in accordance with the first embodiment of the invention, $C_5H_5N$ and $NH_3$ are illustrated as a nitride that is used in the nitrification treatment process. However, in the nitride that can be used in the invention is not limited to these nitrides. Examples of other nitrides usable in the nitrification treatment process include $N_2H_2$, pyridazine ($C_4H_4N_2$), pyrrole ($C_4H_5N$), imidazole ($C_3H_4N_2$), etc.

A hydrogen generation method in accordance with a second embodiment of the invention includes a process of reacting ammonia and the lithium hydride that has been activated by the lithium hydride activation method in accordance with the first embodiment of the invention. According to the lithium hydride activation method in accordance with the first embodiment of the invention, it becomes possible to greatly improve the utilization rate of lithium hydride in the hydrogen generation reaction, as mentioned above. Therefore, according to the second embodiment of the invention, it is possible to provide a hydrogen generation method that is able to improve the efficiency in the generation of hydrogen due to the use of above-described lithium hydride.

Hereinafter, the invention will be further concretely described with reference to examples.

(1) Activation of Lithium Hydride

A vessel containing a pyridine solution was placed in an inert atmosphere (99.99% of Ar), and a nitrification treatment of immersing a lithium hydride powder in the pyridine solution for 120 minutes was performed. After that, the lithium hydride powder subjected to the nitrification treatment was separated from the pyridine solution, and a drying treatment of drying the lithium hydride powder for 180 minutes in a vacuum (0.1333 Pa) was performed. After that, the lithium hydride powder having undergone the drying treatment was put into a ball mill device (type P-5 of Fritsch Co.), and the particle size reduction process was performed for 15 hours in a hydrogen atmosphere (1 MPa, room temperature). Thus, a lithium hydride powder in accordance with this example was fabricated. On the other hand, a lithium hydride powder in accordance with a comparative example was fabricated through substantially the same processes as in the fabrication of the lithium hydride powder in accordance with the example, except that the nitrification treatment was not performed.

(2) Hydrogen Generation Reaction

The lithium hydride powder in accordance with the example and the lithium hydride powder in accordance with the comparative example both fabricated as described above were separately reacted with ammonia to generate hydrogen. Then, the masses of the lithium hydride powders before and after the reaction were measured to find the utilization rates of the two powders. Incidentally, as for the hydrogen generation reaction using the lithium hydride powder in accordance with the example and the hydrogen generation reaction using the lithium hydride powder in accordance with the comparative example, the mechanical pulverization treatment was not carried out during the hydrogen generation reaction. As a result, the lithium hydride powder in accordance with the example achieved a utilization rate of 80 to 90% while the lithium hydride powder in accordance with the comparative example achieved a utilization rate of 20 to 30%. Therefore, the use of the lithium hydride powder in accordance with the example generated a larger amount of hydrogen than the use of the lithium hydride powder in accordance with the comparative example, when the masses of the lithium hydride powders used were the same. As described above, according to the invention, it is possible to activate lithium hydride, and it is possible to improve the efficiency in the generation of hydrogen by using the lithium hydride that has been activated by the invention.

The invention is intended to cover various modifications and equivalent arrangements. In addition, while the various elements of the example embodiments are shown in various combinations and configurations, other combinations and configurations, including more, less or only a single element, are also within the spirit and scope of the invention.

What is claimed is:

1. A hydrogen generation method comprising:
performing a nitrification treatment of reacting lithium hydride with a nitrogen atom containing compound and therefore forming a chemical compound layer stable to the nitrogen atom containing compound, on a surface of the lithium hydride;
reducing a particle size of the lithium hydride provided with the chemical compound layer by a mechanical pulverization treatment after the nitrification treatment is performed to produce a pulverized lithium hydride; and
generating hydrogen by reacting ammonia and the pulverized lithium hydride;
wherein the lithium hydride is not being pulverized by a mechanical pulverization treatment while generating hydrogen.

2. The hydrogen generation method according to claim 1, wherein the nitrogen atom containing compound includes one or more species of nitrogen atom containing compounds selected from the group consisting of $NH_3$, $N_2H_2$, $C_4H_4N_2$, $C_4H_5N$, $C_3H_4N_2$, and $C_5H_5N$.

3. The hydrogen generation method according to claim 1, wherein the particle size reduction is performed in a hydrogen atmosphere.

4. The hydrogen generation method according to claim 1, wherein the particle size reduction is performed in an inert gas atmosphere.

5. A solid polymer type fuel cell comprising
a lithium hydride treated by using the lithium hydride activation method according to claim 1.

* * * * *